US008200934B2

(12) United States Patent
Kasahara et al.

(10) Patent No.: US 8,200,934 B2
(45) Date of Patent: Jun. 12, 2012

(54) DATA TRANSFER UNIT IN MULTI-CORE PROCESSOR

(75) Inventors: Hironori Kasahara, Tokyo (JP); Keiji Kimura, Tokyo (JP); Takashi Todaka, Hadano (JP); Tatsuya Kamei, Higashiyamato (JP); Toshihiro Hattori, Kodaira (JP)

(73) Assignees: Hitachi, Ltd., Tokyo (JP); Renesas Electronics Corporation, Kawasaki-shi (JP); Waseda University, Tokyo (JP)

( * ) Notice: Subject to any disclaimer, the term of this patent is extended or adjusted under 35 U.S.C. 154(b) by 363 days.

(21) Appl. No.: 11/865,669

(22) Filed: Oct. 1, 2007

(65) Prior Publication Data

US 2008/0086617 A1    Apr. 10, 2008

(30) Foreign Application Priority Data

Oct. 6, 2006   (JP) .................................. 2006-274879

(51) Int. Cl.
*G06F 12/00* (2006.01)
(52) U.S. Cl. ..................... 711/168; 711/154; 711/167
(58) Field of Classification Search .................. 711/154; 710/28
See application file for complete search history.

(56) References Cited

U.S. PATENT DOCUMENTS

| 4,920,480 | A | 4/1990 | Murakami et al. | |
|---|---|---|---|---|
| 6,108,693 | A | 8/2000 | Tamura | |
| 6,885,217 | B2 | 4/2005 | Shinagawa | |
| 2002/0010836 | A1* | 1/2002 | Barroso et al. | 711/122 |
| 2003/0225958 | A1* | 12/2003 | Efland et al. | 711/1 |
| 2003/0236931 | A1 | 12/2003 | Shinagawa | |
| 2005/0055528 | A1* | 3/2005 | Arimilli et al. | 711/203 |
| 2005/0086417 | A1* | 4/2005 | Meyer et al. | 711/5 |
| 2005/0149708 | A1* | 7/2005 | Gat et al. | 712/239 |
| 2006/0123152 | A1* | 6/2006 | Koch et al. | 710/22 |
| 2006/0161741 | A1* | 7/2006 | Yasue et al. | 711/152 |
| 2006/0206635 | A1* | 9/2006 | Alexander et al. | 710/22 |
| 2007/0055839 | A1* | 3/2007 | Hanes et al. | 711/165 |
| 2009/0006774 | A1* | 1/2009 | Bartley et al. | 711/154 |

FOREIGN PATENT DOCUMENTS

| JP | 61-264829 A | 11/1986 |
|---|---|---|
| JP | 62-028865 A | 2/1987 |
| JP | 62-192844 A | 8/1987 |
| JP | 62-219153 A | 9/1987 |
| JP | 63-216170 A | 9/1988 |
| JP | 02-252044 A | 10/1990 |
| JP | 04-062610 A | 2/1992 |
| JP | 05-282243 A | 10/1993 |

(Continued)

*Primary Examiner* — Jared Rutz
*Assistant Examiner* — Gurtej Bansal
(74) *Attorney, Agent, or Firm* — Miles & Stockbridge P.C.

(57) ABSTRACT

To reduce overhead of data transfer between processor cores and improve a processing capability of a processor, there is provided a processor including: a CPU for performing computing processing; an internal memory for storing data; and a data transfer unit for performing data transfer between the internal memory and a shared memory, in which: the data transfer unit includes: a command chain module for executing a command sequence formed of a plurality of commands including a data transfer instruction; and a monitor module for reading data set in advance in the internal memory and repeatedly monitoring the data until a comparative value and a value of the data become equal to each other, when one of the plurality of commands of the command sequence thus read is a predetermined command; and the command chain module executes a next command in the command sequence after the monitor module has finished monitoring.

16 Claims, 11 Drawing Sheets

FOREIGN PATENT DOCUMENTS

| | | |
|---|---|---|
| JP | 6-149749 A | 5/1994 |
| JP | 6-282515 A | 10/1994 |
| JP | 9-330288 A | 12/1997 |
| JP | 11-120156 A | 4/1999 |
| JP | 2004-021938 A | 1/2004 |
| JP | 2005-309649 A | 11/2005 |

* cited by examiner

DATA TRANSFER UNIT IN MULTI-CORE PROCESSOR

CLAIM OF PRIORITY

The present application claims priority from Japanese application P2006-274879 filed on Oct. 6, 2006, the content of which is hereby incorporated by reference into this application.

BACKGROUND OF THE INVENTION

This invention relates to a data transfer unit which is incorporated in a data processing unit.

In a data processing unit such as a processor, an efficient data transfer leads to better performance of the processor as a whole.

In a case where the data processing unit transfers a large amount of data, when a CPU (general-purpose processor) performs the data transfer, another process which is supposed to be executed by the CPU is delayed, which leads to a problem that the performance of the entire system is deteriorated.

In order to solve the above-mentioned problem, a current data processing unit generally employs a data transfer processor called direct memory access controller (DMAC), which is used to transfer data in place of the CPU (see, for example, JP 06-149749 A, JP 06-282515 A, and JP 09-330288A). Accordingly, the CPU is merely required to set a data transfer start command to the DMAC, and can perform another process while the DMAC is performing data transfer.

According to the above-mentioned method, the CPU is required to set the data transfer start command to the DMAC when the data transfer is necessary. Further, there also arises a need to monitor whether the DMAC is in operation or not.

To set the data transfer start command for each data transfer as described above may not appear as overhead as long as a transfer data length is long, but it may appear as a large overhead when the transfer data length is short, which hinders improvements in performance. Also, there is a growing demand for an optimization technology in which a compiler is employed to automatically insert a data transfer instruction, which otherwise requires difficult programming, to thereby avoid the troublesome programming work. However, in a case where the above-mentioned optimizing compiler has analyzed, based on a certain computation, that a plurality of data transfers are necessary, the CPU drives the DMAC at each of the data transfers, which still leads to a large overhead, making it difficult to efficiently create the data transfer instructions by the compiler.

As regards a method for reducing the number of times to set the data transfer start command by the CPU, there has been proposed a method called command chain. According to the command chain, instead of giving a data transfer start instruction through the CPU each time the data transfer is performed, all the data transfer instructions are set as a list on a storage device in advance and the CPU instructs the DMAC to perform data transfer according to each one of the data transfer instructions from the top of the list, to thereby cause the DMAC to sequentially read the transfer instructions on the storage device and perform data transfer.

According to this method, the CPU only executes a start of the first data transfer, and the DMAC performs the data transfer after the first data transfer by starting the commands. Accordingly, the CPU is required to set the data transfer start command only once. Therefore, the CPU can allocate time, which conventionally would have been needed to set the data transfer command, to another processing. Further, with the data transfer function of the DMAC, which is highly autonomous as described above, it is possible to efficiently execute data transfer, which has been analyzed to be necessary by the compiler, during execution.

SUMMARY OF THE INVENTION

In recent years, a multi-core processor which includes a plurality of processor cores provided on a single semiconductor chip has become widespread, due to the limit on improvement in an operation frequency of a processor. In the multi-core processor, the processes of the plurality of processor cores are paralleled to improve a processing capability without increasing the operation frequency of the processor. Also, to increase productivity of a program for the multi-core processor, studies have been made of the optimization compiler capable of performing automatic parallelization, memory management, and creation of a data transfer instruction.

However, the conventional hardware technology is successful in improving the processing capability only in a case where a single CPU performs computing processing when the DMAC performs data transfer through the command chain. According to the conventional hardware technology, in a case where the plurality of processor cores perform processing in parallel with one another, the processor cores need to perform communication with one another, which may leads to overhead. For example, there is examined an example in which, in a case two processor cores perform data transfer through the storage device, the DMAC of a processor core B reads data written in the storage device (shared storage device) by the DMAC of a processor core A, and the processor core B processes the data.

First, the processor core A instructs the DMAC which is incorporated therein to transfer data in the processor core A to the storage device, and the DMAC starts a process of transferring the data to the storage device. On the other hand, the processor core B which is to use the data needs to inquire the processor core A about whether the data transfer has been completed because it is uncertain that the writing of data to the storage device by the processor A has been completed or not. The processor core B cannot instruct the DMAC of the processor core B to transfer data until the processor core B is notified of completion of the data transfer as a result of inquiry made to the processor core A, and therefore, the processor core B cannot perform computing processing because the processor core B is making inquiry and waiting for a process.

As described above, in a case where data is exchanged between a plurality of processor cores, even when each of the processor cores is provided with a data transfer unit such as the DMAC, there arises a need to perform communication between the processor cores. Due to overhead and waiting for a process caused by the communication, it is difficult to improve a processing capability of the entire processor. Even when the compiler has succeeded in extracting the data transfer, there still exists a problem that it is difficult to efficiently insert a data transfer instruction.

In view of the above-mentioned circumstances, this invention has been made to solve the above-mentioned problems, and it is an object of this invention to provide a multi-core processor including a plurality of processor cores each provided with a data transfer unit, in which overhead of data transfer between the processor cores is reduced and it is made easy for a compiler to perform data transfer optimization, to thereby improve a processing capability of the entire processor.

According to the present invention, there is provided a processor including: a computing unit for performing one of computing processing and signal processing; a storage unit for storing data; and a data transfer unit for performing data transfer between the storage unit and a storage device, in which: the data transfer unit comprises: a command chain module for reading and executing a command sequence formed of a plurality of commands including a data transfer instruction, based on an instruction from the computing unit, the command sequence being stored in advance in one of the storage unit and the storage device; and a monitor module for reading data set in advance in one of the storage device and the storage unit and repeatedly monitoring the data until a comparative value which is set in advance and a value of the data become equal to each other, when one of the plurality of commands of the read command sequence is a predetermined monitor command; and the command chain module causes the monitor module to execute a next command in the command sequence after the monitor module has finished monitoring.

According to another aspect of the present invention, the processor further includes: a plurality of processor cores each including the computing unit, the storage unit, and the data transfer unit; and a data set module for writing predetermined data in a region set in advance in one of the storage unit and the storage device, when one of the plurality of commands of the read command sequence is a predetermined data set command.

In the processor according to further another aspect of the present invention, the monitor module monitors the data set in advance, which is being written into one of the storage device and the storage unit.

Therefore, according to this invention, the computing unit is required to give the data transfer instruction only to the data transfer unit. Once the data transfer instruction is given, the data transfer unit independently decides an execution timing of the next command. Accordingly, it is possible to reduce the overhead of data transfer between the processor cores, to thereby improve a processing capability of the entire processor. Further, it is made easier for the compiler to perform data transfer optimization, which increases productivity of the program.

DETAILED DESCRIPTION OF THE PREFERRED EMBODIMENTS

First Embodiment

Hereinbelow, an embodiment of this invention will be described with reference to the accompanying drawings.

Figure 1:
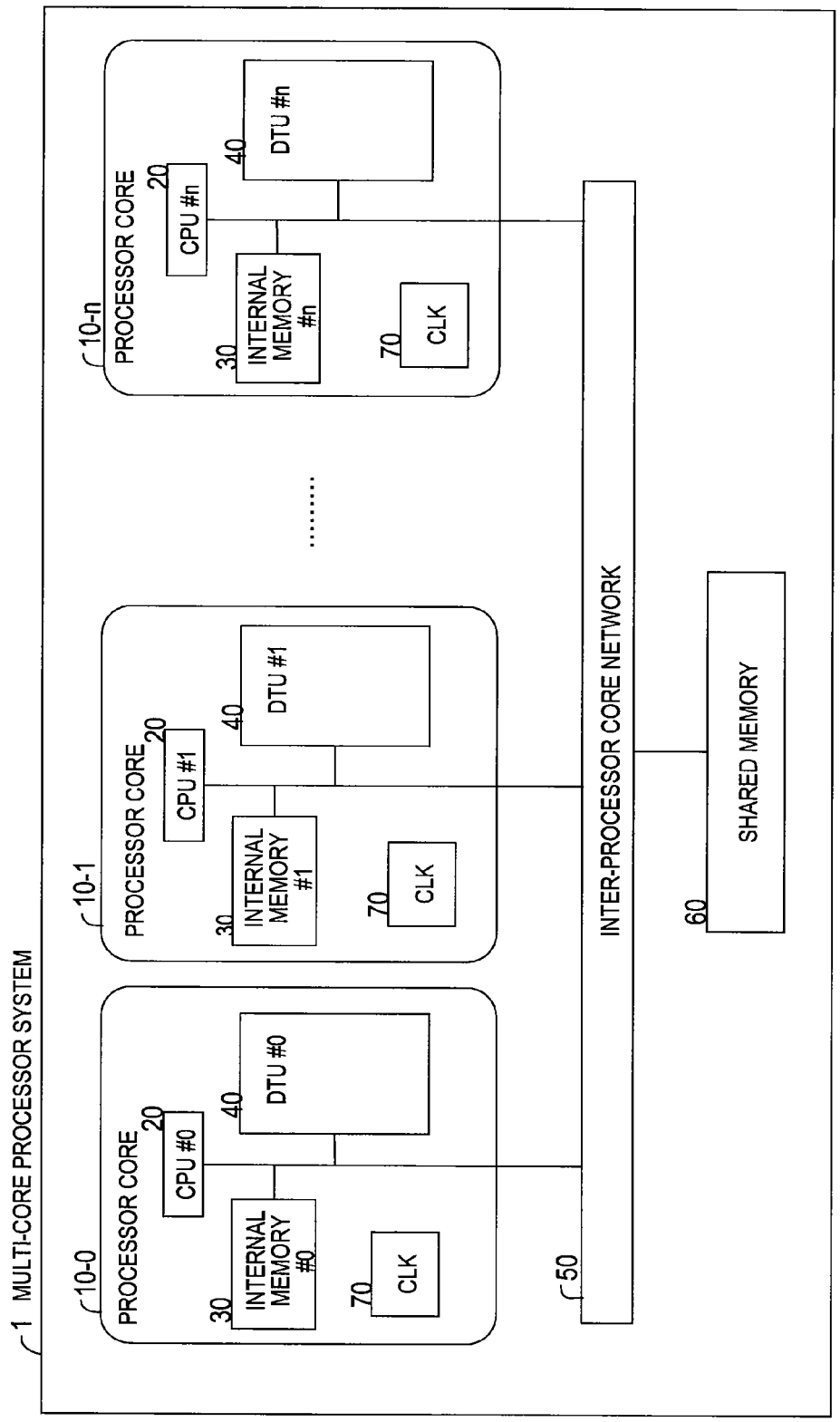
FIG. 1 is a block diagram showing a configuration of a processor according to a first embodiment of this invention.

FIG. 1 is a block diagram showing a configuration of a multi-core processor system (data processing unit) according to a first embodiment of this invention.

In FIG. 1, the multi-core processor system 1 mainly includes a plurality of processor cores 10-0 to 10-$n$, a shared memory 60 shared by the processor cores 10-0 to 10-$n$, and an inter-processor core network 50 connecting the processor cores 10-0 to 10-$n$ and the shared memory 60 to one another. The inter-processor core network 50 may be formed of a shared bus, a crossbar, or the like.

This embodiment is described as, for example, a homogeneous multi-core processor system in which the processor cores each include the same command set and configuration. Accordingly, a description will be given only of the processor core 10-0, on the assumption that other processor cores 10-1 to 10-$n$ are similar to the processor core 10-0 in configuration.

The processor core 10-0 includes a CPU 20 for performing computing processing, an internal memory (local memory) 30 for storing data and commands, a data transfer unit 40 for transferring data between the internal memory 30 and the shared memory 60, or between the internal memory 30 and another one of the internal memory 30 of any one of the other processor cores 10-1 to 10-$n$, and a clock generating unit 70 for supplying a clock to the CPU 20, the internal memory 30, and the data transfer unit 40. In a case where a storage device is externally provided to the multi-core processor system 1, the data transfer unit 40 is capable of transferring data between the internal memory 30 and the external storage device.

The data transfer unit 40 includes a direct memory access controller (DMAC), and performs data transfer between the internal memory 30 and the shared memory 60, or between the internal memory 30 and another one of the internal memory 30 of any one of the other processor cores 10-1 to 10-$n$, in the background of the CPU 20.

When a data transfer instruction is received from the CPU 20, the data transfer unit 40 can successively execute data transfer by using the DMAC and the command chain described in the above-mentioned conventional examples. After instructing the data transfer unit 40 to transfer data, the CPU 20 can execute computing processing of its own, leaving the data transfer process to the data transfer unit 40.

Figure 2:
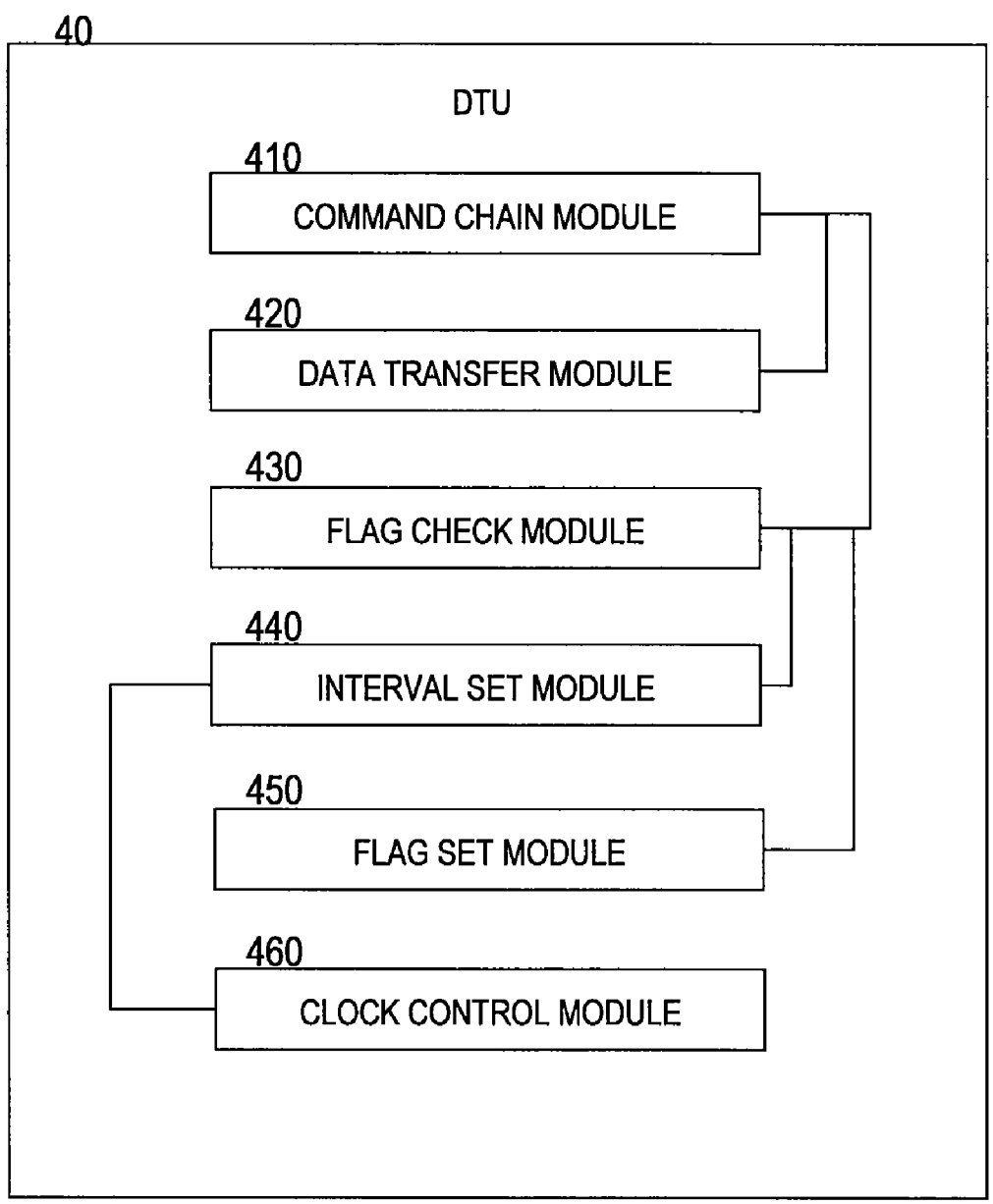
FIG. 2 is a block diagram showing a function of a data transfer unit according to the first embodiment.

FIG. 2 is a functional block diagram of the data transfer unit 40. The data transfer unit 40 includes: a command chain module 410; a data transfer module 420; a flag set module (data set module) 450, a flag check module (monitor module) 430, an interval set module 440; and a clock control module 460. The command chain module 410 sequentially executes commands in a command sequence including a data transfer instruction, which has been written in the internal memory 30 (or the shared memory 60) in advance. The data transfer module 420 performs data transfer between the internal memory 30 and the shared memory 60 or the like by the DMAC, based on the data transfer instruction read by the command chain module 410. The flag set module (data set module) 450 writes predetermined data such as a flag in a predetermined region of the shared memory 60 (or the internal memory 30). The flag check module (data check module) 430 repeatedly judges a value of the flag set in the shared memory 60 (or the internal memory 30) until the value of the flag becomes equal to a comparative value which has been set in advance. The interval set module 440 sets periods or intervals at which the flag is checked. The clock control module 460 reduces an operation clock of the data transfer unit 40 during a waiting time of the flag check.

When a predetermined instruction is received from the CPU 20, the command chain module 410 of the data transfer unit 40 sequentially reads commands in the command sequence which has been read into the internal memory 30 (or the shared memory 60) in advance, and causes each of the modules to execute each of the commands.

The command chain module 410 reads and executes, in response to the instruction given by the CPU 20, a first one of the commands in the command sequence read by the CPU 20 into the internal memory 30. Then, when one of the commands is completed, the command chain module 410 reads and executes a next command in sequence as will be described later. Examples of commands processed in the data transfer unit 40 include a put command for transferring data from the internal memory 30 to the storage device externally provided to the processor core, a get command for transferring data from the storage device externally provided to the processor core to the internal memory 30, a set command for setting a flag in a predetermined region of the shared memory 60 (or the internal memory 30) and writing a designated value therein, and a check command for comparing the designated value (comparative value) and a value of the flag set in the shared memory 60 (or the internal memory 30), which are issued and stored in the internal memory 30.

The command chain module 410 reads the above-mentioned commands from the internal memory 30, and causes each module corresponding to each of the commands to function accordingly.

The data transfer module 420 includes the DMAC, and performs data transfer between the internal memory 30 and the shared memory 60, or between the internal memory 30 and another one of the internal memory 30 of any one of the other processor cores 10-1 to 10-n, by executing the put command or the get command. The data transfer unit 420 performs data transfer for transferring data items in continuous areas, and also performs data transfer such as stride transfer, gather transfer, or scatter transfer for transferring data items having discontinuous addresses.

The flag set module 450 sets a flag in a predetermined region of the shared memory 60 (or the internal memory 30) by executing the set command, and writes a designated value therein.

The flag check module 430 repeatedly executes the check command until the value of the flag becomes equal to the designated value (comparative value).

The interval set module 440 sets periods at which the flag is checked by the flag check module 430, to thereby prevent a situation where a check cycle of the flag is too shortened to increase a load to be imposed on the inter-processor core network 50. The waiting time of the flag check refers to a time period between a flag check and a next flag check. During this waiting period, the data transfer unit 40 does not need to operate all the functions, and therefore the operation clock is reduced or stopped by the clock control module 460, to thereby suppress wasteful power consumption. The clock control module 460 keeps supplying a clock of predetermined frequency to a circuit for counting the waiting time even when the clock is reduced or stopped.

In this embodiment, the flag is used for determining timing of reading or writing data when data is exchanged between a plurality of processor cores, which will be described later. When data transfer is performed between two processor cores, in a case where one of the processor core first writes data in the shared memory 60 and then the other processor reads the data from the shared memory 60 to use the data, the one of the processor which writes the data sets a flag and the other processor which reads the data checks the value of the flag. In other words, the data transfer unit 40 of the processor core which writes the data sets the flag on the shared memory 60 to a predetermined value when the data transfer is completed. The other processor core which reads the data monitors the value of the flag on the shared memory 60 by the data transfer unit 40, and starts reading the data only after the value of the flag has reached a predetermined value. In this manner, in a case where data transfer is performed between the plurality of processor cores, it is only necessary that the CPU 20 of each of the processor cores 10-0 to 10-n instructs the data transfer unit 40 to write or read data and to set or check the flag. Between the processor cores, the data transfer unit 40 of one of the processor cores uses the flag to indicate, by the value of the flag, that the writing of data has been completed, and any other one of the processor cores can detect, based on the value of the flag, that the data transfer has been completed, and read the data which has been reliably written by the one of the processor cores. A value of the flag to be set and a value to be compared may be set to the same value in a program.

As described above, the data transfer unit 40 manipulates the flag on the shared memory 60 (or the internal memory 30), the flag being for synchronizing data transfer, which makes it possible to read and write data between the processor cores with accuracy, without causing the CPUs 20 to communicate with one another.

Figure 3:
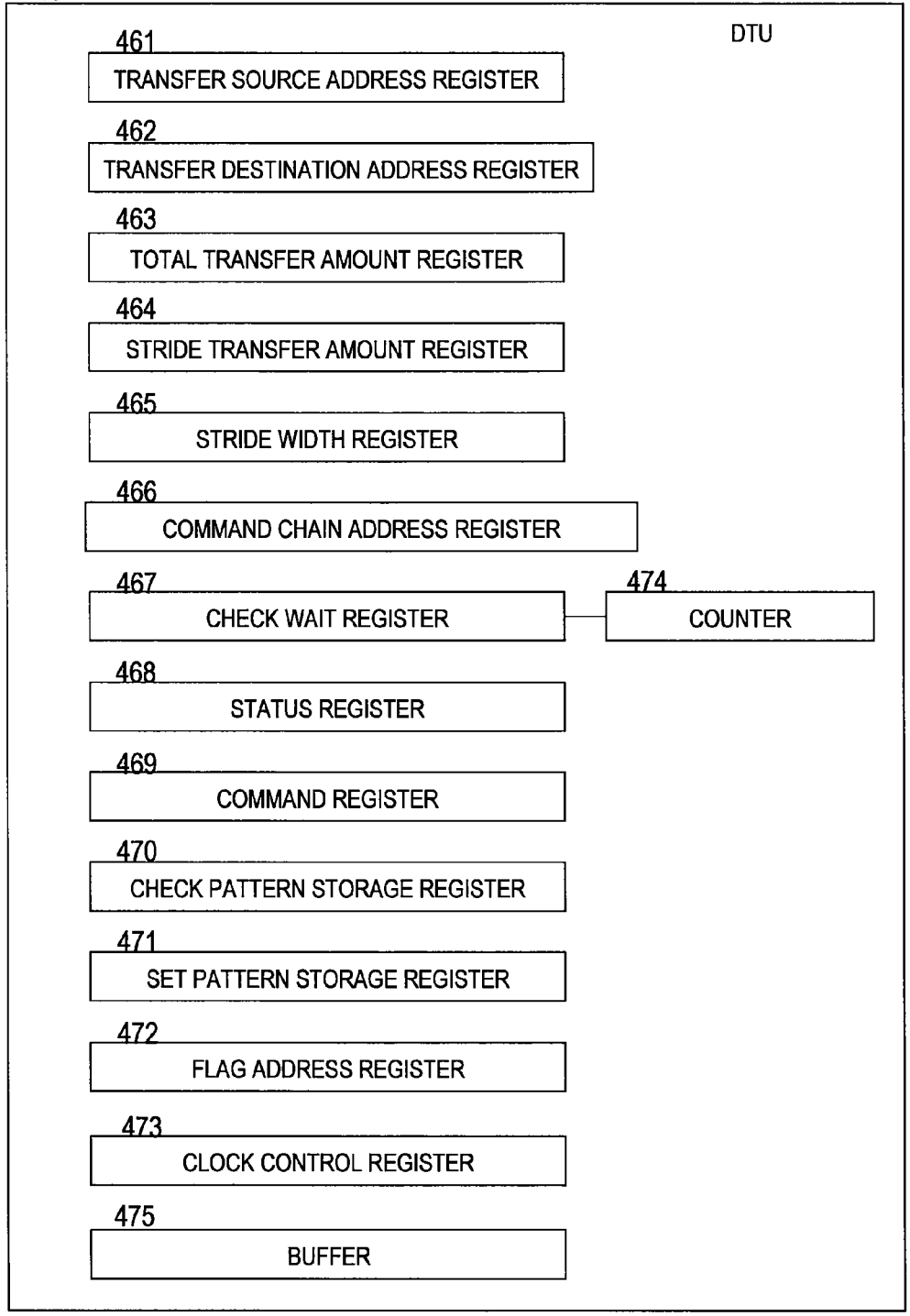
FIG. 3 is a block diagram of a main register configuration of the data transfer unit according to the first embodiment.

FIG. 3 is a block diagram showing main registers included in a group of registers forming the data transfer unit 40.

A transfer source address register 461 sets an address of the internal memory 30 or the shared memory 60 which stores data to be read. A transfer destination address register 462 sets an address of the internal memory 30 or the shared memory 60 in which data is to be written. A total transfer amount register 463 sets a size of data to be transferred. A stride transfer amount register 464 sets a transfer amount of data when the data is transferred by stride transfer, gather transfer, or scatter transfer for transferring data items having discontinuous addresses. A stride width register 465 sets an interval of memory addresses when performing the stride transfer, the gather transfer, or the scatter transfer.

A command chain register 466 sets addresses to commands stored in the internal memory 30 (or the shared memory 60) when a command chain function is effective. A check wait register 467 is a register for setting a length of the waiting time of the flag check. A value set by the check wait register 467 is counted by a counter 474 which is constantly driven by a predetermined clock frequency. When the value of the counter 474 becomes equal to the value of the check wait register 467, the flag check module 430 checks the flag of the shared memory 60 (or the internal memory 30).

A status register 468 may store a value indicating a data transfer status of the data transfer unit 40. A command register 469 stores commands corresponding to functions required of the data transfer unit 40 by the CPU 20. A check pattern storage register 470 stores a value to be compared with a value of the flag on the shared memory 60 in performing the flag check. A set pattern storage register 471 stores a value of the flag to be set in the shared memory 60. A flag address register 472 stores an address of the shared memory 60 in which the flag is stored.

A clock control register 473 sets a value of the operation clock frequency in a case of reducing or stopping the operation clock to the data transfer unit 40 during the waiting time of the flag check.

Also, the data transfer unit 40 includes a buffer 475 for temporality storing an instruction or data from the CPU 20.

The CPU 20 sets a predetermined value for each of the above-mentioned registers, and the data transfer unit 40 performs data transfer or monitoring based on a command instructed by the CPU 20.

Figure 4:
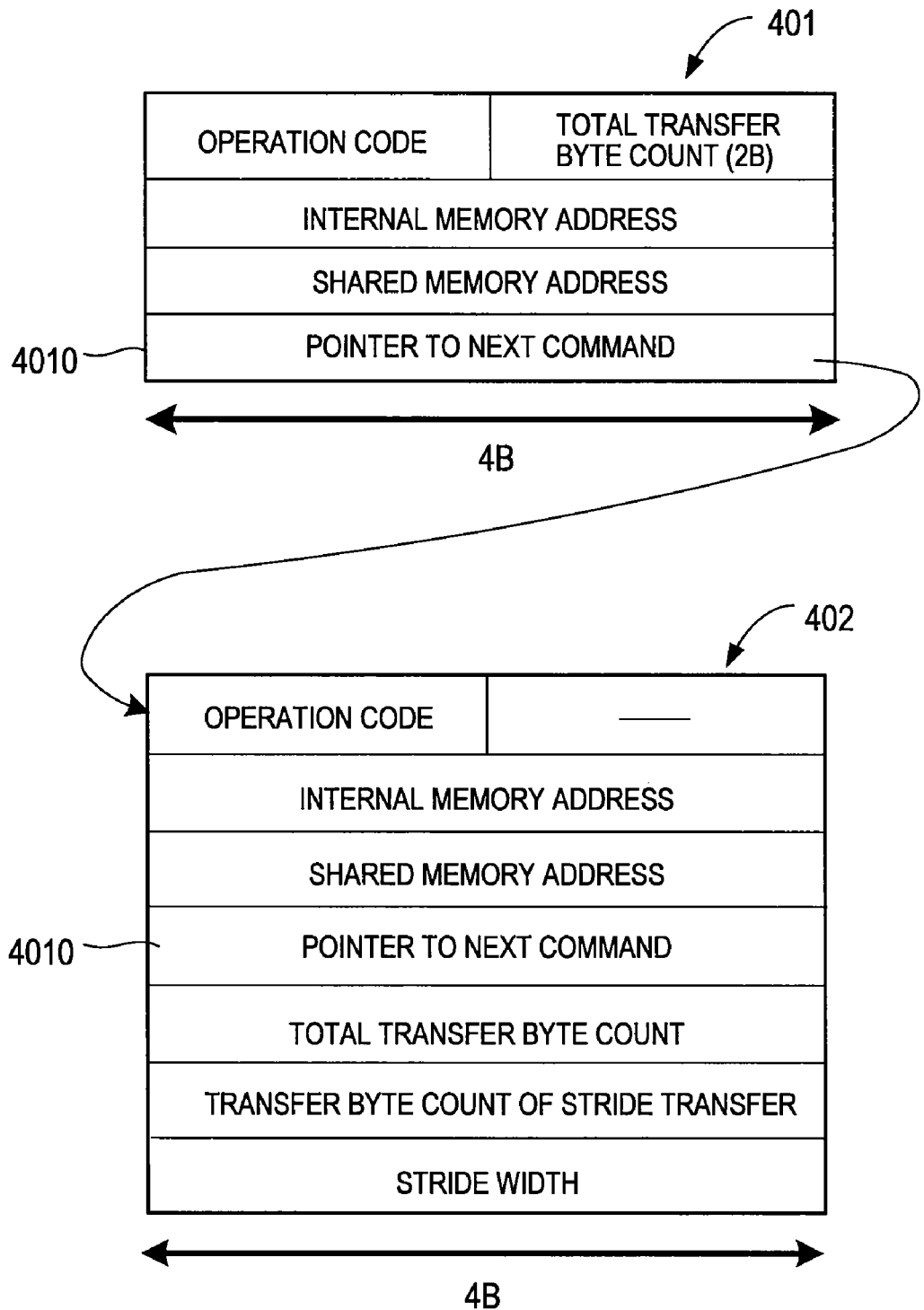
FIG. 4 is an explanatory diagram showing a format of a command sequence to be handled by the data transfer unit according to the first embodiment.

FIG. 4 shows an example of a command sequence set to the internal memory 30 by the command chain function. For the commands included in the command sequence, a short command 401 shown in FIG. 4 is used to describe a command for performing data transfer in regions having continuous addresses stored in a memory (the internal memory 30 or the shared memory 60) or to describe a command for setting or checking the flag. On the other hand, a long command 402 shown in FIG. 4 is used to perform stride transfer, gather transfer, or scatter transfer for performing data transfer in regions having discontinuous addresses stored in the memory.

The short command 401 is formed of an operation code, a total transfer byte count, an internal memory address, a shared memory address, and a pointer to a next command 4010, which are arranged in the stated order from the top.

The operation code controls data transfer performed by the data transfer unit 40, and gives an instruction such as the put/get command, the set command, the check command, or a chain command.

The internal memory address designates, in response to the put/get command, a top address of the internal memory 30 which is to be a transfer source or a transfer destination.

The shared memory address designates, in response to the put/get command, a top address of the shared memory 60 which is to be a transfer source or a transfer destination.

One of the internal memory address and the shared memory address designates, in response to the set command and the check command, an address to be set or checked and the other one of the internal memory address and the shared memory address designates a value to be set or checked. For example, in a case where the flag is set on the shared memory 60, an address of the flag is set to the shared memory address and a value of the flag is set to the internal memory address.

The pointer to a next command 4010 designates an address of a memory to store a command which should be executed next. The total transfer byte count designates the transfer byte count relating to the put/get command.

The long command 402 includes, in addition to the operation code, the total transfer byte count, the internal memory address, the shared memory address, and the pointer to a next command 4010 included in the short command 401, a total transfer byte count, a transfer byte count of stride transfer, and a stride width, which follow the pointer to a next command 4010 in the stated order. The transfer byte count of stride transfer designates transfer byte counts relating to gather transfer and scatter transfer performed in response to the put/get command. The stride width designates a stride interval in gather/scatter transfer performed in response to the put/get command.

Figure 5:
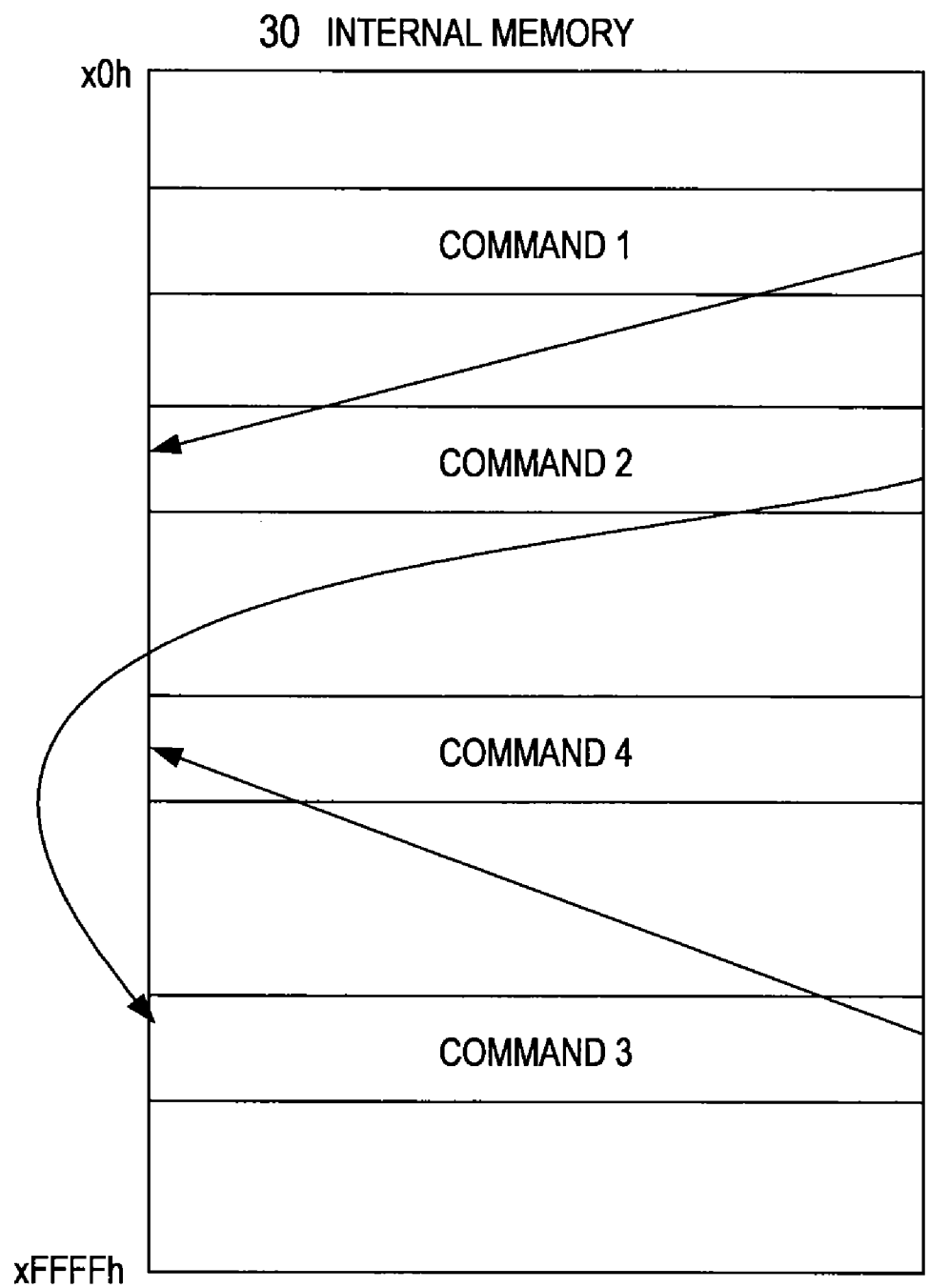
FIG. 5 shows a map illustrating a command sequence stored in an internal memory according to the first embodiment.

In a case of using the command chain function of the data transfer unit 40, the CPU 20 stores in advance the command sequence shown in FIG. 4 in the internal memory 30 (or the shared memory 60) as shown in FIG. 5. Then, in response to an instruction given by the CPU 20, the command chain module 410 reads out the command sequence and performs data transfer or the like. The CPU 20 writes the command sequence designated by a program to be executed in a predetermined storage region (such as the internal memory 30 or the shared memory 60).

In FIG. 5, commands 1 to 4 are stored in arbitrary regions of the internal memory 30. As shown in FIG. 4, the pointer to a next command 4010 designates an address of a command to be read next by the data transfer unit 40. The CPU 20 sequentially writes commands to writable regions in the internal memory 30, and therefore the execution order of the commands and the addresses of the commands do not correspond to each other.

The execution of the command by using the command chain is performed by the command chain module 410 which sequentially reads commands in the command sequence in response to an instruction given by the CPU 20.

In the example of FIG. 5, the command chain module 410 can execute the command sequence by reading the command 2 when the execution of the command 1 is completed, and sequentially reading the commands 3 and 4. Since the pointer to a next command 4010 of the last command 4 does not include an address of the internal memory 30, it is determined that the command 4 is a last command, and the command chain module 410 ends the execution of a series of the command sequence.

The CPU 20 can collectively give instructions relating to a plurality of data transfers by using the command chain function provided by the command chain module 410 of the data transfer unit 40, which enables the CPU 20 to perform computing processing after finishing giving the instructions.

Figure 6:
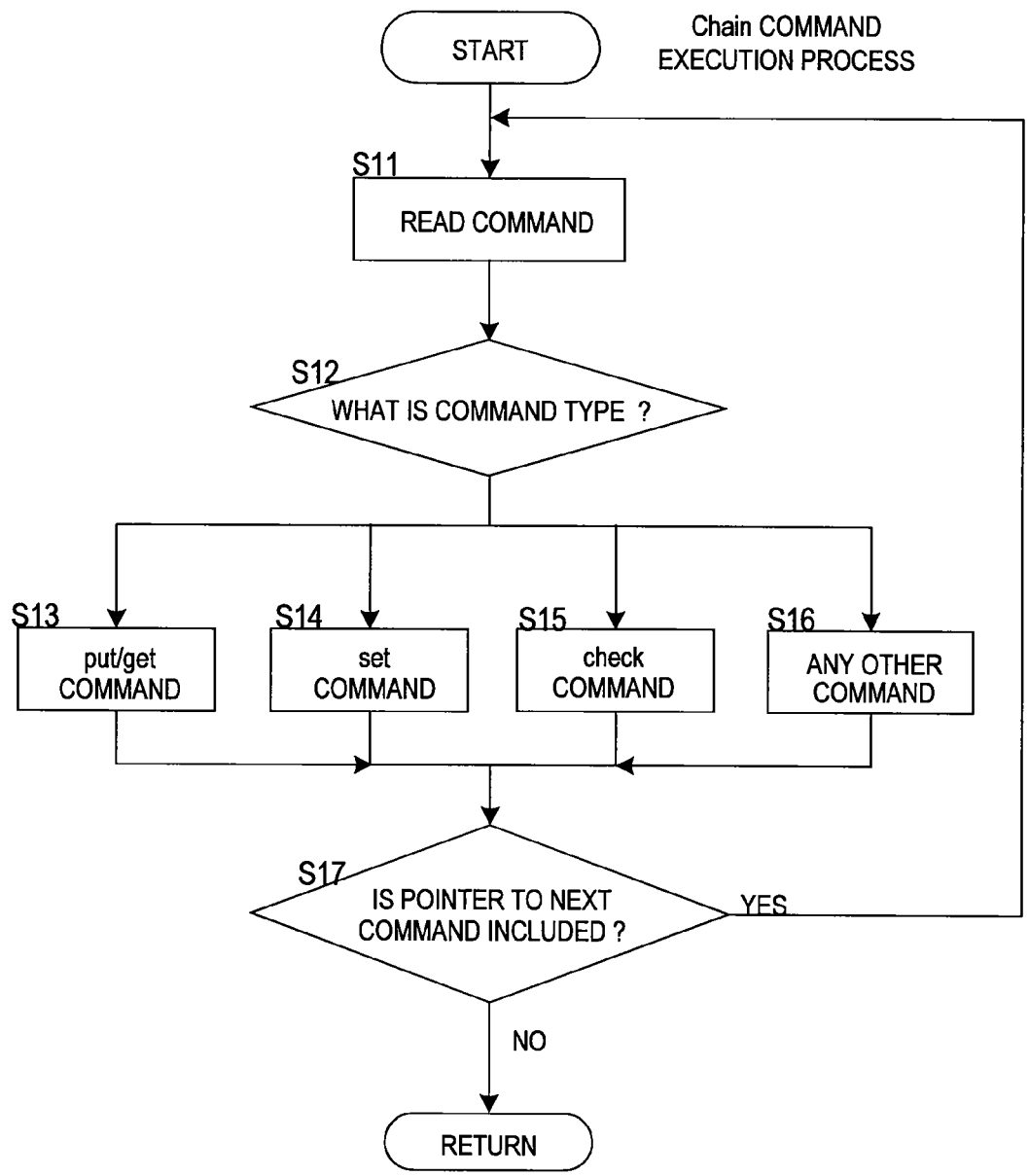
FIG. 6 shows a flowchart illustrating an example of a command chain process for executing the command sequence according to the first embodiment.

FIG. 6 shows a flowchart illustrating an example of an execution process of a chain command performed by the data transfer unit 40. This process is executed in response to an instruction given by the CPU 20 after the writing of the command sequence of FIG. 4 has been completed. An instruction to be given by the command chain may be set by a compiler when compiling a program.

In Step S11, the command chain module 410 sequentially reads commands in the command sequence of the internal memory 30 from the top. The command chain module 410 determines a type of each of the commands in Step S12. In Step S12, a module (a functional element corresponding to any one of, for example, the data transfer module 420 to flag set module 450 of FIG. 2) corresponding to the type of the command is executed.

In the case where the type of the command thus read is the put command or the get command, the process proceeds to Step S13. In the case of the set command, the process proceeds to Step S14. In the case of the check command, the process proceeds to Step S15. In the case where the type of the command is any other type than those commands, the process proceeds to Step S16.

In Step S13, in the case of the put command, an address of the internal memory 30 is set in the transfer source address register 461, an address of the shared memory 60 is set in the transfer destination address register 462, a total amount of data is set to the total transfer amount register 463, and the put command is set to the command register 469, to thereby perform writing process from the internal memory 30 to the shared memory 60.

On the other hand, in the case of the get command, an address of the shared memory 60 is set in the transfer source address register 461, an address of the internal memory 30 is set in the transfer destination address register 462, a total amount of data is set to the total transfer amount register 463, and the get command is set to the command register 469, to thereby perform reading process from the shared memory 60 to the internal memory 30.

In the case of performing data transfer such as stride transfer, gather transfer, or scatter transfer for transferring data items having discontinuous addresses, a total amount of data to be transferred is set to the stride transfer amount register 464, an interval of the addresses is set to the stride width register 465, and an identifier for identifying whether the data transfer is stride transfer, gather transfer, or the scatter transfer is set to the command register 469.

In the case of the set command in Step S14, an address stored in the shared memory 60 is set to the flag address register 472, a value of a flag is set to the set pattern storage register 471, and the set command is stored in the command register 469, to thereby execute setting process of the flag.

In the case of the check command in Step S15, an address stored in the shared memory 60 is set to the flag address register 472, the comparative value with respect to the flag is set to the check pattern storage register 470, and the check command is stored in the command register 469, to thereby execute checking process of the flag. The check command will be described later in detail.

In the case of any other command in Step S16, the process is executed by setting a value designated by the CPU 20 to a register corresponding to the type of the command.

When the execution of the process is completed in any one of the Steps S13 to S16, the process proceeds to Step S17, and the command chain module 410 refers to the pointer 4010 of a command which has been executed, ad determines whether the pointer 4010 includes an address of a command to be executed next. When an address of a command to be executed next is set to the pointer 4010, the process return to Step S11 and the next command is executed. On the other hand, when an address of a command to be executed next is not set to the pointer 4010, which means that the command which has been executed is a last command of the command sequence, the command chain process is ended accordingly.

Through the above-mentioned process, the data transfer unit 40 sequentially executes the command sequence (commands 1 to 4) on the internal memory 30 shown in FIG. 5, to thereby continuously execute a process relating to data transfer, independently of the CPU 20.

In a case where no command chain instruction is given to the data transfer unit 40, the data transfer unit 40 may function equally to the ordinary DMAC.

Figure 7:
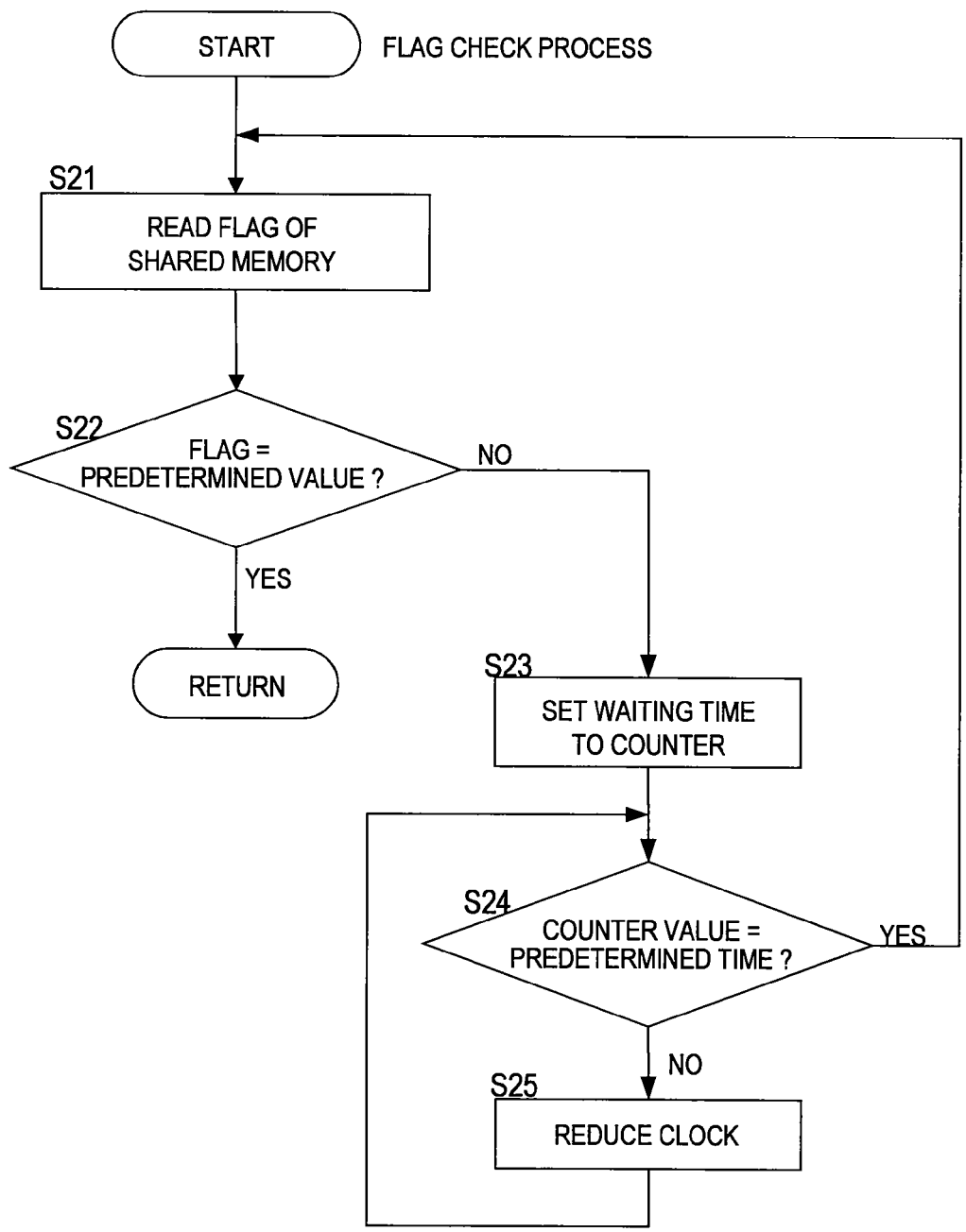
FIG. 7 shows a flowchart illustrating an example of a flag check process according to the first embodiment.

Next, a description will be given of a process performed by the flag check module 430, which characterizes the data transfer unit 40 of this invention. FIG. 7 shows a flowchart illustrating an example of the process performed by the flag check module 430 of the data transfer unit 40. The flowchart is executed when the command chain module 410 reads the check command.

The flag check module 430 reads an address stored in the shared memory 60 to which the flag is set and a comparative value with respect to the flag, from the check command read by the command chain module 410. Then, in Step S21, the flag check module 430 reads the flag based on the address stored in the shared memory 60 designated by the check command. Next, in Step S22, it is determined whether or not the comparative value with respect to the flag obtained from the check command is equal to the value of the flag read in Step S21.

When the read value of the flag is equal to the comparative value with respect to the flag, it is determined that a process performed by another processor core, for example, data transfer to the shared memory 60, has been completed, and the process of the flag check module 430 is ended. After that, the command chain module 410 reads and executes another command designated by the pointer to a next command 4010 included in the check command.

On the other hand, when the value of the flag is different from the comparative value with respect to the flag, the process proceeds to Step S23, in which the count of the waiting time of the flag check is started. Specifically, a value corresponding to the waiting time is set to the check wait register 467 of FIG. 3 and the counter 474 starts the count.

In Step S24, it is determined whether or not the value of the counter 474 has reached the value of the check wait register 467. When the value of the counter 474 has reached the value of the check wait register 467, which means that a predetermined waiting time has elapsed, the process returns to Step S21 to repeat the checking of the flag again.

On the other hand, when the waiting time has not elapsed, the process proceeds to Step S25, in which the operation clock of the data transfer unit 40 is reduced. Specifically, an operation clock frequency to which the operation clock is to be reduced is set to the clock control register 473, and the operation clock for driving the data transfer unit 40 is reduced.

Then, the process returns again to the process in Step S24 to repeat the reduction of the clock in Step S25 until the waiting time elapses.

Through the above-mentioned process, the flag of the shared memory 60 is monitored each time a predetermined waiting time elapses, thereby enabling the data transfer unit 40 to detect the completion of data transfer from another processor core to the shared memory 60, without excessively increasing a load to be imposed on the inter-processor core network 50. During this time, the CPU 20 can perform predetermined computing processing, and therefore the processing capability is not impaired.

When the operation clock of the data transfer unit 40 is stopped instead of being reduced in Step S25, the operation clock to the counter 474 (or timer) is constantly supplied by the clock generation unit 70. Then, the counter 474 (or timer) may interrupt the CPU 20 after a lapse of a predetermined period to restart the data transfer unit 40.

Figure 8:
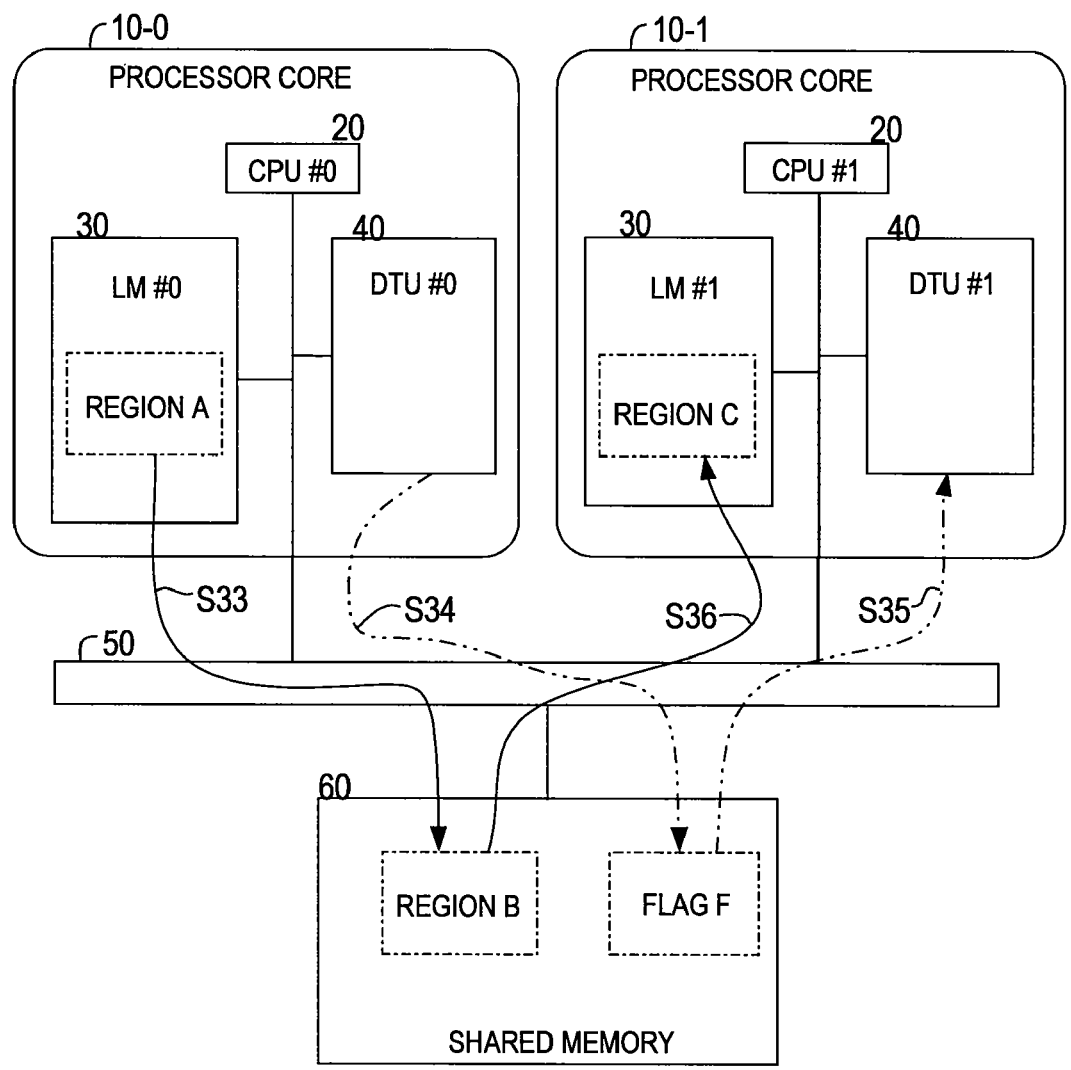
FIG. 8 is a block diagram showing a case where data is transferred between two processor cores.
Figure 9:
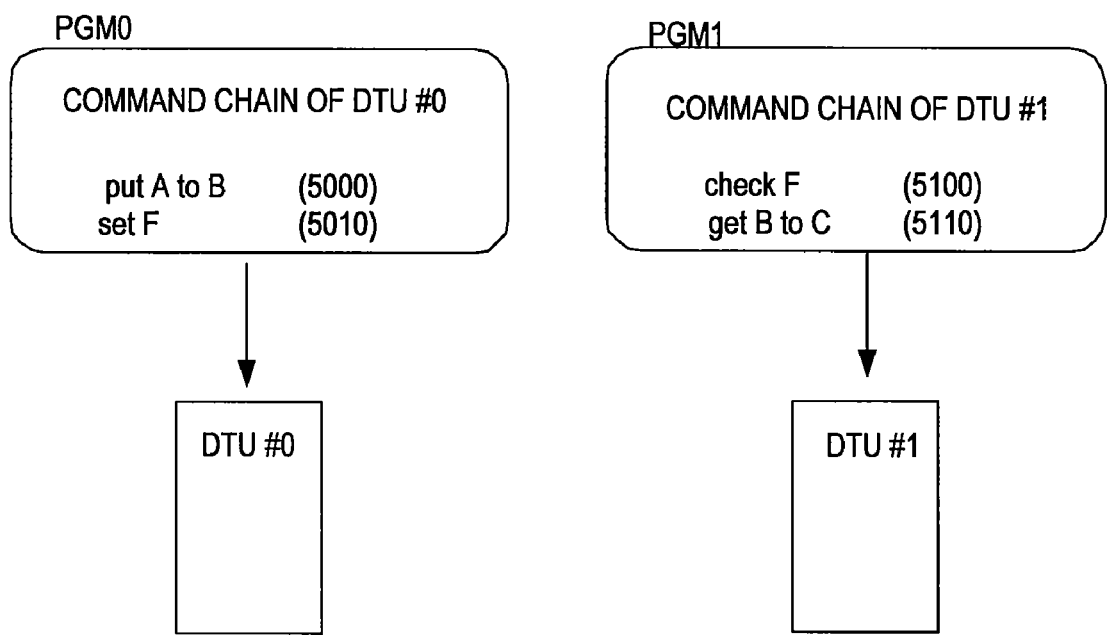
FIG. 9 is an explanatory diagram showing instructions included in command chains which are executed by two data transfer units.
Figure 10:
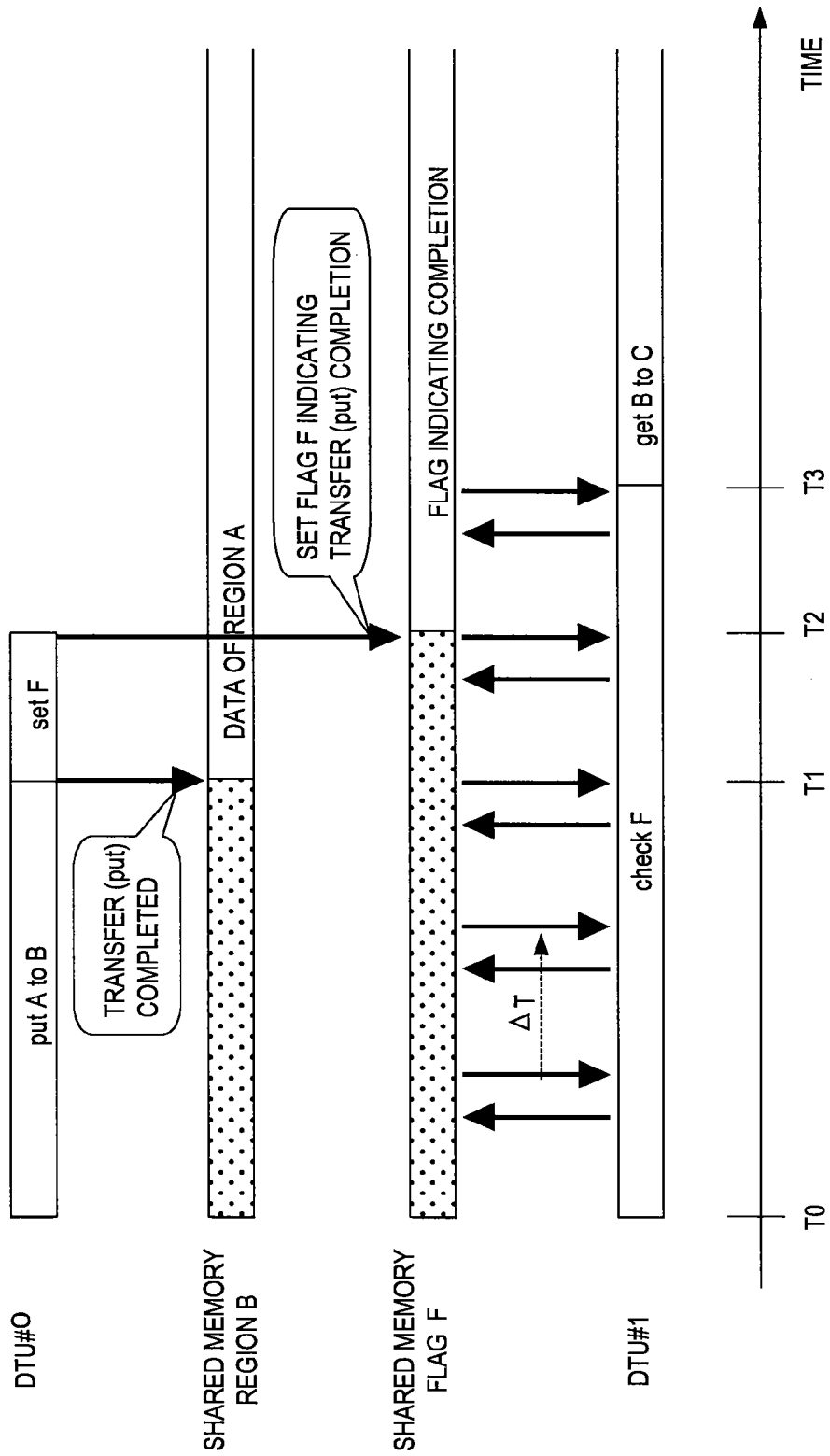
FIG. 10 shows a time chart illustrating a case where data is transferred between two processor cores.

Next, FIGS. 8 to 10 show a case where data is transferred between a plurality of processor cores through the shared memory 60. In this case, there is shown an example of performing data transfer between the data transfer units 40 by using the set command and the check command.

In FIG. 8, the CPU 20, the data transfer unit 40, and the internal memory 30 of the processor core 10-0 of FIG. 1 are referred to as CPU#0, DTU#0, and LM#0, respectively. Similarly, the CPU 20, the data transfer unit 40, and the internal memory 30 of the processor core 10-1 of FIG. 1 are referred to as CPU#1, DTU#1, and LM#1, respectively.

Then, described is the case where the two processor cores 10-0 and 10-1 each use the command chain function of each of the DTU#0 and DTU#1, the DTU#0 of the processor core 10-0 transfers data in a region A of the LM#0 to a region B of the shared memory 60 (S33), and after that, the DTU#1 of the processor core 10-1 transfers data in the region B of the shared memory 60 to a region C of the LM#1 (S36). Then, described is an example where the DTU#0 sets a flag F to a predetermined region of the shared memory 60 when the data transfer has been completed (S34), and the DTU#1 starts transferring data to a region C of the LM#1 from the shared memory 60 after determining that the value of the flag F becomes equal to a predetermined comparative value S35.

FIG. 9 shows examples of command chains each to be instructed to the DTU#0 and the DTU#1 by the processor cores 10-0 and 10-1 by executing a predetermined program, respectively. The processor core 10-0 instructs a command chain PGM0 of FIG. 9 to the DTU#0, and the processor core 10-1 instructs the command chain PGM1 to the DTU#1. The processor cores 10-0 and 10-1 instruct the command chains PGM0 and PGM1 substantially at the same time.

The processor core 10-0 instructs the DTU#0 to process a plurality of commands described below, in accordance with the command chain PGM0.

"put A to B": Write data in the region A of the LM#0 to the region B of the shared memory 60.

"set F": Set the flag F to the shared memory 60 after writing data.

The processor core 10-1 instructs the DTU#1 to process a plurality of commands described below, in accordance with the command chain PGM1.

"check F": Monitor the flag F of the shared memory 60 at predetermined time intervals until the flag F becomes equal to the predetermined comparative value.

"get B to C": Read data from the region B of the shared memory 60 to transfer the data to the region C of the LM#1.

It should be noted that the region on the shared memory 60 to store the flag F and the set value and the comparative value of the flag F are set in advance in the program executed by the processor core 10-0 and the processor core 10-1.

In the processor core 10-0, the CPU#0 instructs the command chain PGM0 to the DTU#0, and sets a command sequence to the internal memory LM#0, which is executed by the DTU#0. Similarly, in the processor core 10-1, the CPU#1 instructs the command chain PGM1 to the DTU#1, and sets a command sequence to the internal memory LM#1, which is executed by the DTU#1.

A result obtained by executing the above-mentioned command chains is shown in a time chart of FIG. 10. In FIG. 10, at a time T0, the DTU#0 of the processor core 10-0 starts transferring data in the region A of the internal memory LM#0 to the region B of the shared memory 60. When the data transfer to the region B is completed at a time T1, the DTU#0 executes the set command that follows the put command to set the flag F to a predetermined address of the shared memory 60 at a time T2. In other words, when the put command and the set command are used in combination, it is possible to convey information that the data transfer of the DTU#0 has been completed to another DTU of another processor core by means of the flag F of the shared memory 60.

On the other hand, in the processor core 10-1, the DTU#1 monitors, from the time T0, whether the flag F of the shared memory 60 becomes equal to the comparative value at predetermined time intervals ΔT. The DTU#1 repeatedly monitors a value of the flag F at the predetermined intervals ΔT as long as the value of the flag F does not match the predetermined comparative value. Then, the DTU#1 detects, at the time T2 at which the flag F is set by the DTU#0, that the data transfer of the processor core 10-0 has been completed because the value of the flag F has become equal to the comparative value. Then, the DTU#1 performs data transfer to the region C of the LM#1 from the region B of the shared memory 60 by executing the get command that follows the check command at the time T3.

As described above, in the case of transferring data between the two processor cores 10-0 and 10-1, the data transfer command such as the put command or the get command is used in combination with the set command for setting the flag F and the check command for monitoring the flag F by means of the command chain function, which enables the DTUs to independently determine among the DTUs a timing of data transfer after the CPUs #0 and #1 have instructed the data transfer. Accordingly, it is possible to reduce overhead of data transfer between the processor cores, to thereby improve the processing capability of the multi-core processor system 1 as a whole.

Also, the flag F is monitored at predetermined time intervals ΔT, which makes it possible to prevent a communication load to be imposed on the inter-processor core network 50 from being excessively increased, thereby improving the processing capability of the multi-core processor system 1 as a whole.

Further, the operation clock frequency of the data transfer unit 40 is reduced during the waiting time of the monitoring of the flag F to suppress wasteful power consumption, to thereby provide the multi-core processor system 1 of high performance and low power consumption.

In the first embodiment, the flag F is set to the shared memory 60. However, the flag F may be set to any one of the internal memories LM#0 and LM#1. Also, in the first embodiment, the data transfer is performed through the shared memory 60. However, the data transfer may be performed between the internal memories 30 of the processor cores.

Further, the first embodiment has been illustrated as an example where this invention is applied to a homogeneous multi-core processor system in which the processor cores each include the same command set and configuration. However, this invention may also be applied to a heterogeneous multi-core processor system in which the processor cores include command sets and configurations different from one another. For example, in addition to the processor core including the CPU 20 for performing computing processing, there may be provided a processor core which includes a digital signal processor (DSP) for performing signal processing and a processor core which includes a dynamically reconfigurable processor (DRP).

Also, in the first embodiment, the CPU 20 writes a command sequence including a plurality of commands into the internal memory 30. However, the command sequence may be written into the shared memory 60 or the external storage device of the multi-core processor system 1 and may be executed by the data transfer unit 40.

Second Embodiment

Figure 11:
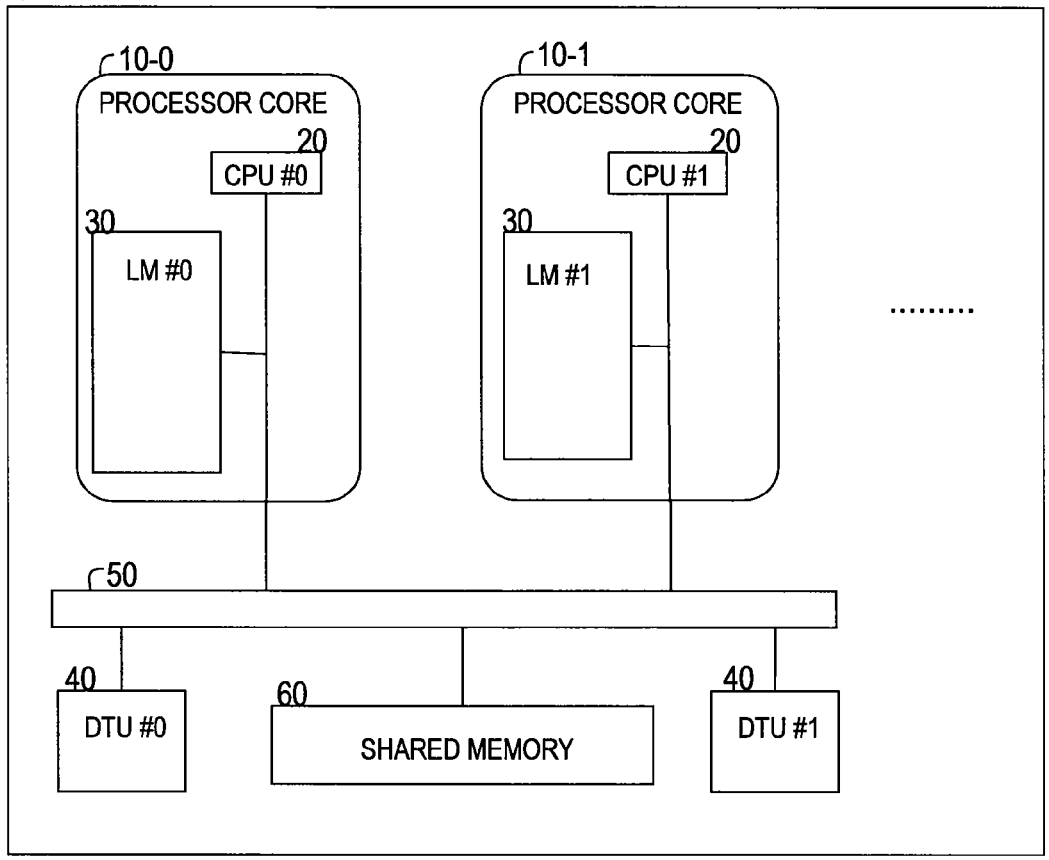
FIG. 11 is a block diagram showing a configuration of a processor according to a second embodiment of this invention.

FIG. 11 shows a second embodiment of this invention, in which the data transfer units 40 of the first embodiment is provided outside the processor cores. The configuration of the second embodiment other than the above is similar to that of the first embodiment. The second embodiment includes the data transfer units DTU#0 and DTU#1 connected to the inter-processor core network 50, which can be used from the processor core 10-0 and the processor core 10-1.

With this configuration, the processor cores 10-0 and 10-1 each may use any one of the data transfer units which is vacant (waiting for processing).

Also, in the first or second embodiment, the multi-core processor system 1 may have an architecture in which the multi-core processor system 1 operates in coordination with a code which includes a command chain output by a predetermined compiler. Specifically, the predetermined compiler creates, based on an analysis of a program, a command sequence for the data transfer unit 40 on a local memory (the internal memory 30), the command sequence including a data transfer command sequence (command sequence) and a synchronization command sequence for ensuring an order relation between the data transfer units 40. The multi-core processor system 1, when executing the command sequence output by the predetermined compiler, which includes the data transfer command sequence and the synchronization command sequence, passes the head of those command sequences to the data transfer units 40, and the data transfer units 40 process those command sequences independently of the operation of the multi-core processor system 1.

As described above, this invention is capable of reducing overhead of data transfer when applied to a multi-core processor system including a plurality of processor cores and a computer system including a plurality of processors, to thereby improve a processing capability of the processor.

While the present invention has been described in detail and pictorially in the accompanying drawings, the present invention is not limited to such detail but covers various obvious modifications and equivalent arrangements, which fall within the purview of the appended claims.

What is claimed is:

1. A processor, comprising:
   a plurality of processor cores, each processor core including a computing unit for performing one of data processing and signal processing, a storage unit for storing data, and a data transfer unit for performing data transfer between the storage unit and a storage device,
   wherein
   each data transfer unit includes:
      a command chain module for reading and executing a command sequence based on an instruction from the computing unit, the command sequence being formed of a plurality of commands including a data transfer command, a predetermined flag set command, and a predetermined monitor command, and the command sequence being stored in advance in one of the storage unit and the storage device;
      a data transfer module for performing the data transfer between the storage unit and the storage device through direct memory access;
      a flag set module for writing a flag set in advance in a region set in advance in one of the storage unit and the storage device, when one of the plurality of commands of the read command sequence is the predetermined flag set command,
      a monitor module for reading the flag, which is set in advance in one of the storage device and the storage unit, and repeatedly monitoring the flag set in advance until a comparative value which is set in advance and a value of the flag set in advance become equal to each other, when one of the plurality of commands of the read command sequence is the predetermined monitor command,
   wherein
   each data transfer unit transfers data between the storage unit and the storage device or between the storage unit and a storage unit in a different processor core,
   a transfer source processor core of the plurality of processor cores includes a transfer source data transfer unit, a computing unit of the transfer source processor core instructs the command chain module in the transfer source data transfer unit to read a command sequence including a data transfer command and a flag set command, and the command chain module in the transfer source data transfer unit sequentially executes the command sequence, and after the data transfer module in the transfer source data transfer unit transfers data between the storage unit and the storage device, instructs the flag set module to write the flag set in advance in the region set in advance in the storage device, and
   a transfer destination processor core of the plurality of processor cores includes a transfer destination data transfer unit, a computing unit of the transfer destination processor core instructs the command chain module in the transfer destination data transfer unit to read a command sequence including a monitor command and a data transfer command, the command chain module in the transfer destination data transfer unit sequentially executes the command sequence to instruct the monitor module to monitor the flag, and after a value of the flag becomes equal to the comparative value, the command chain module executes the data transfer command to instruct the data transfer module in the transfer destination data transfer unit to transfer data between the storage device and the storage unit.

2. The processor according to claim 1, wherein the monitor module comprises an interval set module for setting time intervals at which the data set in advance is periodically read.

3. The processor according to claim 2, further comprising a clock supply unit for supplying a clock at least to the computing unit and the data transfer unit,
   wherein the monitor module further comprises a clock control unit for one of reducing and blocking a frequency of the clock to be supplied to the data transfer unit until one of the time intervals elapses.

4. The processor according to claim 1, wherein the plurality of commands further comprises a pointer indicating an address of a storage destination of the next command, which is stored in one of the storage unit and the storage device.

5. The processor according to claim 1,
   wherein the storage device includes:
      a first region in which addresses of items of the data to be transferred which are specified by one of the plurality of commands are shared by the plurality of processor cores; and
      a second region in which addresses of the data set in advance are shared by the plurality of processor cores;
   wherein
      the monitor module writes and reads the data set in advance to and from the second region.

6. The processor according to claim 1, wherein the commands in the command sequence are linked so that the data transfer unit executes the commands in the sequence independently of the computing unit.

7. The processor according to claim 6, wherein the predetermined data set command includes a flag set (setF) command, and the predetermined monitor command includes a flag check (checkF) command.

8. The processor according to claim 1, wherein each processor core executes a program which sets the region in the storage device where the corresponding flag is written.

9. A data transfer unit connected to a processor having a plurality of processor cores, each processor core including a computing unit for performing one of data processing and signal processing, and a storage unit for storing data, the data transfer unit performing data transfer between the storage unit and a storage device based on an instruction from the computing unit and comprising:
   a command chain module for reading and executing a command sequence based on an instruction from the computing unit, the command sequence being stored in advance in one of the storage unit and the storage device, the command sequence being formed of a plurality of commands including a data transfer command, a predetermined flag set command, and a predetermined monitor command;

a data transfer module for performing the data transfer between the storage unit and the storage device through direct memory access;

a flag set module for writing a flag set in advance in a region set in advance in one of the storage unit and the storage device, when one of the plurality of commands of the read command sequence is the predetermined flag set command; and a monitor module for reading the flag, which is set in advance in one of the storage device and the storage unit, and repeatedly monitoring the flag set in advance, until a comparative value which is set in advance and a value of the flag set in advance become equal to each other, when one of the plurality of commands of the read command sequence is a predetermined monitor command, wherein the data transfer unit transfers data between the storage unit and the storage device or between the storage unit and a storage unit in a different processor core, a transfer source processor core of the plurality of processor cores is connected to a transfer source data transfer unit, a computing unit of the transfer source processor core instructs the command chain module in the transfer source data transfer unit to read a command sequence including a data transfer command and a flag set command, the command chain module in the transfer source data transfer unit sequentially executes the command sequence, and after the data transfer module in the transfer source data transfer unit transfers data between the storage unit and the storage device, instructs the flag set module to write the flag set in advance in the region set in advance in the storage device, and a transfer destination processor core of the plurality of processor cores is connected to a transfer destination data transfer unit, a computing unit of the transfer destination processor core instructs the command chain module in the transfer destination data transfer unit to read a command sequence including a monitor command and a data transfer command, the command chain module in the transfer destination data transfer unit sequentially executes the command sequence to instruct the monitor module to monitor the flag, and after a value of the flag becomes equal to the comparative value, the command chain module executes the data transfer command to instruct the data transfer module in the transfer destination data transfer unit to transfer data between the storage device and the storage unit.

10. The data transfer unit according to claim 9, wherein the monitor module comprises an interval set module for setting time intervals at which the data set in advance is periodically read.

11. The data transfer unit according to claim 10, wherein the monitor module comprises a clock control unit for one of reducing and blocking a frequency of a clock to be supplied to the data transfer unit until one of the time intervals elapses.

12. The data transfer unit according to claim 9, wherein the plurality of commands further includes a pointer indicating an address of a storage destination of the next command, which is stored in one of the storage unit and the storage device.

13. The data transfer unit according to claim 9, the storage device including:

a first region in which the addresses of items of the data to be transferred which are specified by one of the plurality of commands are shared by the plurality of processor cores; and a second region in which addresses of the data set in advance are shared by the plurality of processor cores;

wherein the data transfer unit writes and reads the data to and from the first region; and the monitor module writes and reads the data set in advance to and from the second region.

14. The processor according to claim 9, wherein the commands in the command sequence are linked so that the data transfer unit executes the commands in the sequence independently of the computing unit.

15. The processor according to claim 14, wherein the predetermined data set command includes a flag set (setF) command, and the predetermined monitor command includes a flag check (checkF) command.

16. The processor according to claim 9, wherein each processor core executes a program which sets the region in the storage device where the corresponding flag is written.

* * * * *